US012792019B2

(12) United States Patent
Anichkov et al.

(10) Patent No.: US 12,792,019 B2
(45) Date of Patent: Nov. 10, 2026

(54) METHOD AND SYSTEM FOR QUALITY ASSURANCE TESTING OF CONTROL SYSTEMS FOR INVERTER-BASED RESOURCES

(71) Applicant: MERIT SI, LLC, Somerville, NJ (US)

(72) Inventors: Dmitriy A. Anichkov, Somerville, NJ (US); Thomas P. Kuster, Clinton, NJ (US); Nicholas Milam, Ottawa Hills, OH (US); Sachin Soni, Gilbert, AZ (US)

(73) Assignee: MERIT SI, LLC, Somerville, NJ (US)

( * ) Notice: Subject to any disclaimer, the term of this patent is extended or adjusted under 35 U.S.C. 154(b) by 277 days.

(21) Appl. No.: 18/784,998

(22) Filed: Jul. 26, 2024

(65) Prior Publication Data

US 2025/0044774 A1 Feb. 6, 2025

Related U.S. Application Data

(60) Provisional application No. 63/517,023, filed on Aug. 1, 2023.

(51) Int. Cl.
*G05B 19/418* (2006.01)

(52) U.S. Cl.
CPC .................. *G05B 19/41835* (2013.01); *G05B 2219/37591* (2013.01)

(58) Field of Classification Search
CPC ................ G05B 19/41835; G05B 2219/37591
See application file for complete search history.

(56) References Cited

U.S. PATENT DOCUMENTS 11,881,713 B1 * 1/2024 Johnson ............... G05B 13/042
2016/0147920 A1 * 5/2016 Goulkhah .......... G01R 31/2846
703/21

(Continued)

OTHER PUBLICATIONS

WECC Solar Plant Dynamic Modeling Guidelines, “Western Electric Coordinating Council Modeling and Validation Work Group” “WECC PV Power Plant Dynamic Modeling Guide” (Apr. 2014).

(Continued)

*Primary Examiner* — Vincent H Tran
(74) *Attorney, Agent, or Firm* — OSTROLENK FABER LLP

(57) ABSTRACT

A method for testing a plant control system of an inverter-based resource (“IBR”) coupled to an electric power grid, the method comprising: using a power systems modeling environment implemented in an information system, generating an IBR model, the IBR model including an inverter control model, a generator model, a network solution model, and a model power meter; using a hardware-in-the-loop (“HIL”) simulation environment including the IBR model, a phasor data concentrator (“PDC”), a test automation server, and the plant control system, performing a test of the plant control system by iteratively: receiving measurements from the PDC and setpoints from the test automation server and sending the measurements and the setpoints to the plant control system; generating and sending an active power command and a reactive power command from the plant control system to the inverter control model; generating and sending desired active current and desired reactive current from the inverter control model to the generator model; generating and sending active and reactive currents from the generator model to the network solution model, the network solution model generating and sending a terminal voltage measurement to the generator model and the inverter control model, the network solution model generating and sending (Continued)

POI measurements to the model power meter; generating synchrophasors including electrical property information and sending the synchrophasors from the model power meter to the PDC; generating the measurements from the synchrophasors at the PDC; and, storing the synchrophasors as results of the test in the test automation server.

15 Claims, 17 Drawing Sheets

(56) References Cited

U.S. PATENT DOCUMENTS

| | | | | |
|---|---|---|---|---|
| 2020/0195011 | A1* | 6/2020 | de Callafon ............ | H02J 13/12 |
| 2021/0124854 | A1* | 4/2021 | Wang ...................... | G06F 30/18 |
| 2023/0336122 | A1* | 10/2023 | Zhang ..................... | H02S 50/10 |

OTHER PUBLICATIONS

WECC Battery Storage Dynamic Modeling Guideline, “Western Electricity Coordinating Council Modeling and Validation Work Group” (Nov. 2016).

* cited by examiner

METHOD AND SYSTEM FOR QUALITY ASSURANCE TESTING OF CONTROL SYSTEMS FOR INVERTER-BASED RESOURCES

This application claims priority from and the benefit of the filing date of U.S. Provisional Patent Application No. 63/517,023, filed Aug. 1, 2023, and the entire content of such application is incorporated herein by reference.

FIELD OF THE APPLICATION

This invention relates to the field of control systems for inverter-based resources, and more specifically, to a method and system for quality assurance testing of these systems.

BACKGROUND OF THE APPLICATION

A grid-connected inverter-based resource ("IBR") may include a battery energy storage system ("BESS") and a renewable energy plant such as a photovoltaic ("PV") plant, a wind plant, or their hybrids.

FIG. 1 is a block diagram illustrating an example PV plant 100 in accordance with the prior art. (Scc "WECC Solar Plant Dynamic Modeling Guidelines"; https://www.wecc.biz/Reliability/WECC % 20Solar %20Plant %20Dynamic %20Modeling %20Guidelines.pdf; accessed Nov. 11, 2022; and, incorporated herein by reference.) The PV plant 100 includes PV arrays 110 which supply DC power to inverters 120. AC current injected by the inverters 120 is stepped-up to medium voltage by PV inverter transformers 130 and transmitted by a medium voltage PV feeder 140. Further upstream, the medium voltage is stepped up by a substation transformer 150 which typically is equipped with an on-load tap changer ("OLTC"). The substation transformer 150 is connected via an interconnection line 160 to an electric energy transmission network (e.g., the bulk-power system, an electric power grid, etc.) 170 at a point-of-interconnection ("POI") 175. Plant reactive compensation devices 180, if present, are connected at the plant medium voltage bus 190. The plant control system, which is necessary to maintain grid reliability, includes inverter controls located inside the inverters 120, a PV plant supervisory control system 200, and other controls and relay protection devices omitted in FIG. 1 for clarity. The above-mentioned control devices typically communicate with each other using a plant communication network. The PV plant supervisory control system 200 typically acquires electrical properties 201 from the POI 175 and communicates with a plant fleet remote operations center 210 and a utility system operations center 220.

FIG. 2 is a block diagram illustrating an inverter battery storage control system 300 in accordance with the prior art. (See "WECC Battery Storage Dynamic Modeling Guideline"; https://www.wecc.biz/Reliability/WECC%20Battery %20Storage %20Guideline %20updates_%210 0Bo%204-5-17%20SLT%204-7-17%20XX%20SC.docx; accessed Nov. 11, 2022; and, incorporated herein by reference.) The inverter control system 300 acts on active Pref 301 and reactive Qext 302 power references sent by the PV plant supervisory control system 200, with feedback of terminal voltage Vt 303, inverter power output Pgen 304, and inverter reactive output Qgen 305. The control system 300 outputs real Ipcmd 306 and reactive Iqcmd 307 current commands.

FIG. 3 is a block diagram illustrating the PV plant supervisory control system 200 of FIG. 1 in accordance with the prior art. (See "WECC Solar Plant Dynamic Modeling Guidelines"; https://www.wecc.biz/Reliability/WECC%20Solar%20Plant%20Dynamic%20Modeling%20Guidelines.pdf; accessed Nov. 2, 2022; and, incorporated herein by reference). The supervisory control system 200 typically includes the following. First, closed loop voltage regulation at a user-designated bus. The voltage feedback signal 402 has provisions for line drop compensation, voltage droop response, and a user-settable deadband on the voltage error signal. Second, closed loop reactive power regulation on a user-designated branch 403 with user-selectable deadband on the reactive power error signal. Third, a plant-level governor signal derived from frequency deviation 407 at a user designated bus. The frequency droop response is applied to active power flow on a user-designated branch 406. The frequency deviation applied to the droop gain is typically subject to a user-settable deadband.

Typically, inverter control systems 300, plant supervisory control systems 200, and other control and relay protection devices go through quality assurance processes while being developed and manufactured. One problem with this existing approach is that the entire plant control system, which includes the abovementioned control systems and devices, is not typically tested during factory acceptance testing ("FAT"). As such, discrepancies may not be uncovered during FAT.

In addition, when an inverter-based resource is being commissioned, its plant control system (including the above mentioned components) (e.g., 200) goes through a quality assurance process during site acceptance testing ("SAT"). One problem with this existing approach is that not all operating conditions can be tested. For example, low voltage ride-through cannot be simulated involving an actual plant (e.g., 100), and therefore tested during resource commissioning.

A need therefore exists for an improved method and system for implementing a quality assurance process during factory acceptance testing. Accordingly, a solution that addresses, at least in part, the above and other shortcomings is desired.

SUMMARY OF THE APPLICATION

According to one aspect of the application, there is provided a method for testing a plant control system of an inverter-based resource ("IBR") coupled to an electric power grid, the method comprising: using a power systems modeling environment implemented in an information system, generating an IBR model, the IBR model including an inverter control model, a generator model, a network solution model, and a model power meter; using a hardware-in-the-loop ("HIL") simulation environment including the IBR model, a phasor data concentrator ("PDC"), a test automation server, and the plant control system, performing a test of the plant control system by iteratively: receiving measurements from the PDC and setpoints from the test automation server and sending the measurements and the setpoints to the plant control system; generating and sending an active power command and a reactive power command from the plant control system to the inverter control model; generating and sending desired active current and desired reactive current from the inverter control model to the generator model; generating and sending active and reactive currents from the generator model to the network solution model, the network solution model generating and sending a terminal voltage measurement to the generator model and the inverter control model, the network solution model generating and sending POI measurements to the model power meter; generating synchrophasors including electrical property information and sending the synchrophasors from the model power meter to the PDC; generating the measurements from the synchrophasors at the PDC; and, storing the synchrophasors as results of the test in the test automation server.

In accordance with further aspects of the application, there is provided an apparatus such as an information system, an automation server, a control system, a computer system, etc., a method for adapting these, as well as articles of manufacture such as a computer readable medium or product and computer program product or software product (e.g., comprising a non-transitory medium) having program instructions recorded thereon for practicing the method of the application.

BRIEF DESCRIPTION OF THE DRAWINGS

Further features and advantages of the embodiments of the present application will become apparent from the following detailed description, taken in combination with the appended drawings, in which.

It will be noted that throughout the appended drawings, like features are identified by like reference numerals.

DETAILED DESCRIPTION OF THE EXAMPLE EMBODIMENTS

In the following description, details are set forth to provide an understanding of the application. In some instances, certain software, circuits, structures and methods have not been described or shown in detail in order not to obscure the application. The term "information system" or "system" is used herein to refer to any machine for processing data, including the control systems, controllers, energy management systems, supervisory control and data acquisition ("SCADA") systems, computer systems, servers, and network arrangements described herein. The present application may be implemented in any computer programming language provided that the operating system of the data processing system provides the facilities that may support the requirements of the present application. Any limitations presented would be a result of a particular type of operating system or computer programming language and would not be a limitation of the present application. The present application may also be implemented in hardware or in a combination of hardware and software.

Figure 4:
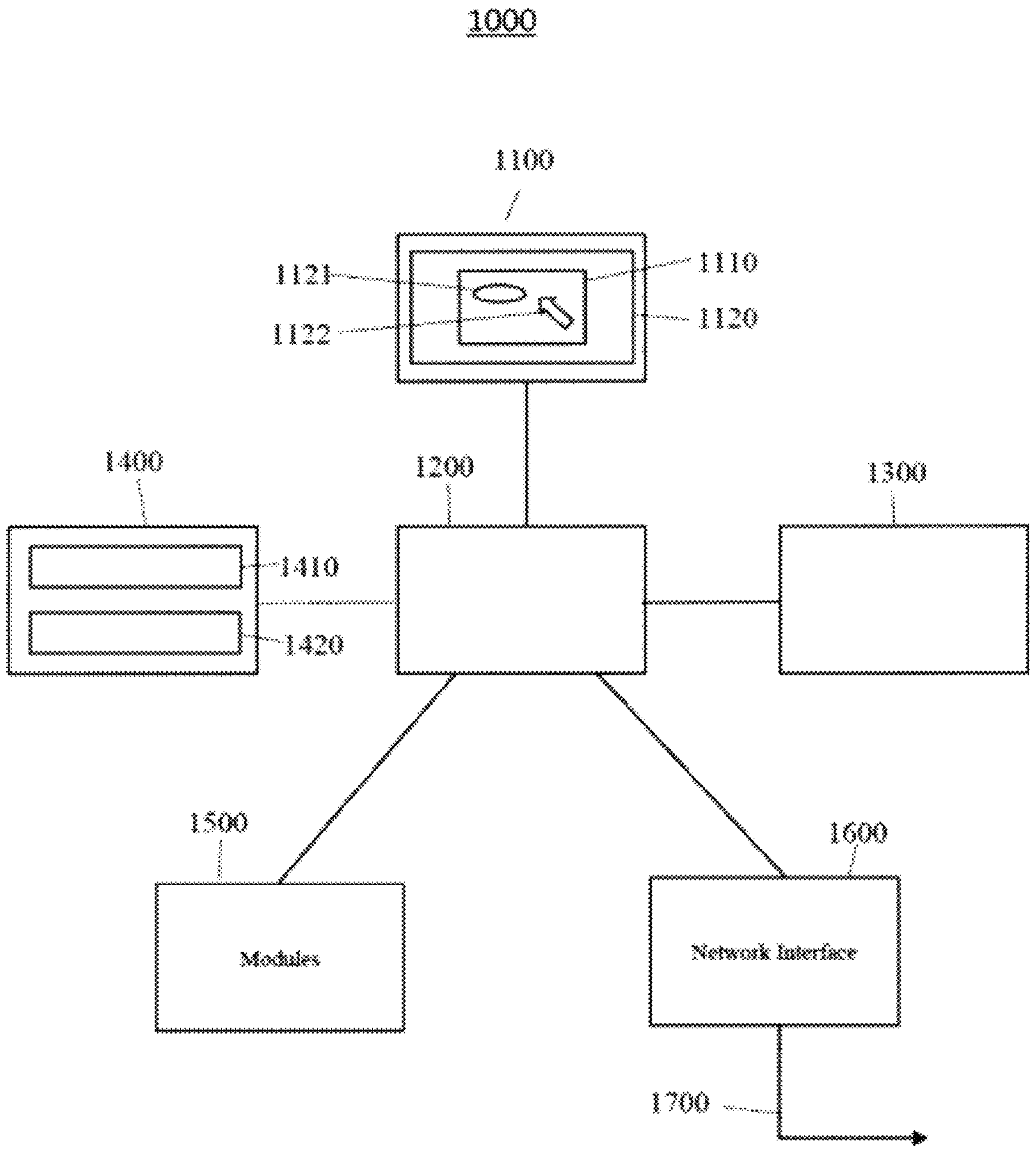
FIG. 4 is a block diagram illustrating an information system in accordance with an embodiment of the application.

FIG. 4 is a block diagram illustrating an information system 1000 in accordance with an embodiment of the application. The information system 1000 is suitable for performing as a control system (e.g., 200, 300), test automation server (e.g., 6010), controller, supervisory control and data acquisition ("SCADA") system, energy management system ("EMS"), or the like. The information system 1000 may be implemented as a virtual machine. The information system 1000 may be a client and/or a server in a client-server configuration. As an example, the information system 1000 may be a server and/or a personal computer, microcontroller, etc. The information system 1000 may be a distributed system deployed on multiple processors or hosts.

The information system 1000 includes a display 1100, a processor or CPU 1200, an input device 1300, memory 1400, and an interface device 1600. The display 1100 may include a computer screen or a television screen. The CPU 1200 is coupled to memory 1400 that stores an operating system 1420 to manage the information system 1000. The CPU 1200 is operatively coupled to an input device 1300 for receiving user commands and to the display 1100 for displaying the results of these commands to a user. These commands may also be received over a network 1700 via the interface device 1600. The CPU 1200 may operate in association with dedicated co-processors, memory devices, or other hardware modules 1500. The input device 1300 may include a keyboard, mouse, touchpad, or the like. The memory 1400 may include a plurality of storage devices including internal memory and an external storage device. For example, the memory 1400 may include databases, random access memory, read-only memory, flash drives, solid state drives, and/or hard disk devices. The information system 1000 may include a database management system and a database 1410 that may be stored in the memory 1400 of the information system 1000. The interface device 1600 may include one or more network connections. The information system 1000 may be adapted to communicate with other information systems (e.g., 200, 210, 220, 300) over a network 1700 via the interface device 1600. For example, the interface device 1600 may include an interface to a network 1700 such as the Internet, a wireless network, a wired network, a serial communications network, etc. Thus, the interface 1600 may include suitable transmitters, receivers, connectors, and the like. The information system 1000 may be associated with other information systems (e.g., 200, 210, 220, 300) over the network 1700. Of course, the information system 1000 may include additional software and hardware, the description of which is not necessary for understanding the application.

The information system 1000 includes programmed computer-executable instructions to implement the embodiments of the present application. The instructions may be embodied in one or more hardware modules 1500 or program (software) modules (e.g., 1420) resident in the memory 1400 of the information system 1000. Alternatively, programmed instructions may be embodied on a machine-readable medium or product such as one or more DVDs, CDS, etc.

A user may interact with the information system 1000 using a user interface ("UI") 1120 such as a graphical user interface. The UI 1120 may be used for monitoring, managing, and accessing the information system 1000. Typically, a UI is used to display information to and receive commands from users and includes a variety of controls including icons, drop-down menus, toolbars, text, buttons, and the like. A user interacts with the UI 1120 presented on a display 1100 by using an input device 1300 to position a pointer or cursor 1122 over a graphical object, for example, an icon, menu, etc. 1121 and by selecting the object 1121. Typically, UI elements are presented in at least one window 1110, that is, a rectangular area within the display 1100. A window 1110 may be open, closed, displayed full screen, reduced in size, or moved to different areas of the display 1100.

The information system 1000 is suitable for performing plant control system 200 testing in a hardware-in-the-loop ("HIL") simulation environment 1800. The environment 1800 includes a model runtime, a model editor, and other auxiliary software and hardware components omitted in the drawings for brevity. The information system 1000 may act as or be included in a test automation server 6010 as described further below.

Figure 5:
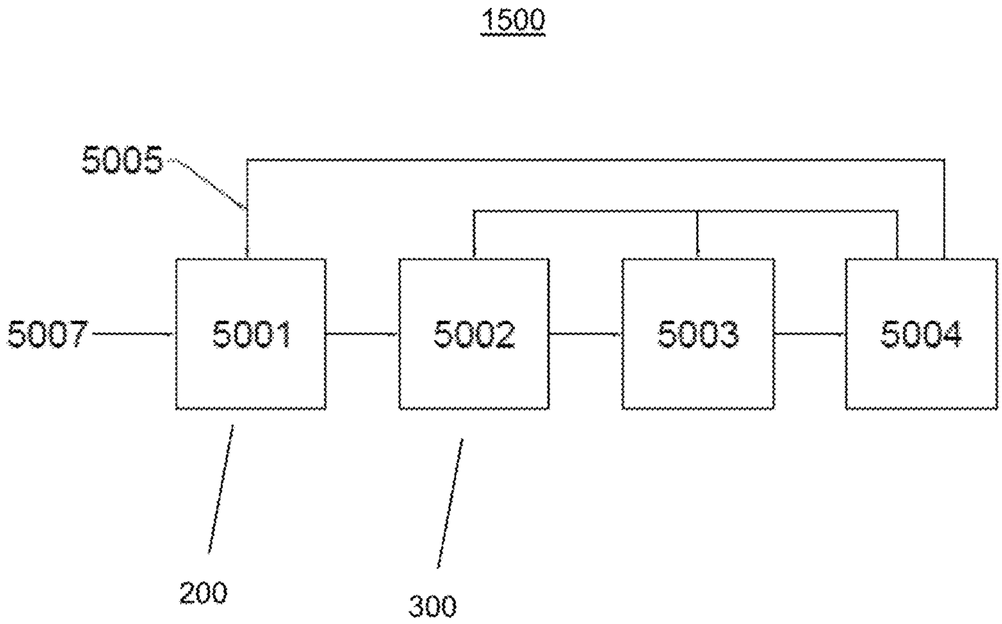
FIG. 5 is a block diagram illustrating a power systems modeling environment in accordance with an embodiment of the application.

FIG. 5 is a block diagram illustrating a power systems modeling environment 1500 in accordance with an embodiment of the application. In particular, FIG. 5 illustrates IBR modeling during interconnection studies in modeling environments such as PSCAD™, as well as Siemens PSS®E, GE PSLF™, or others.

Figure 2:
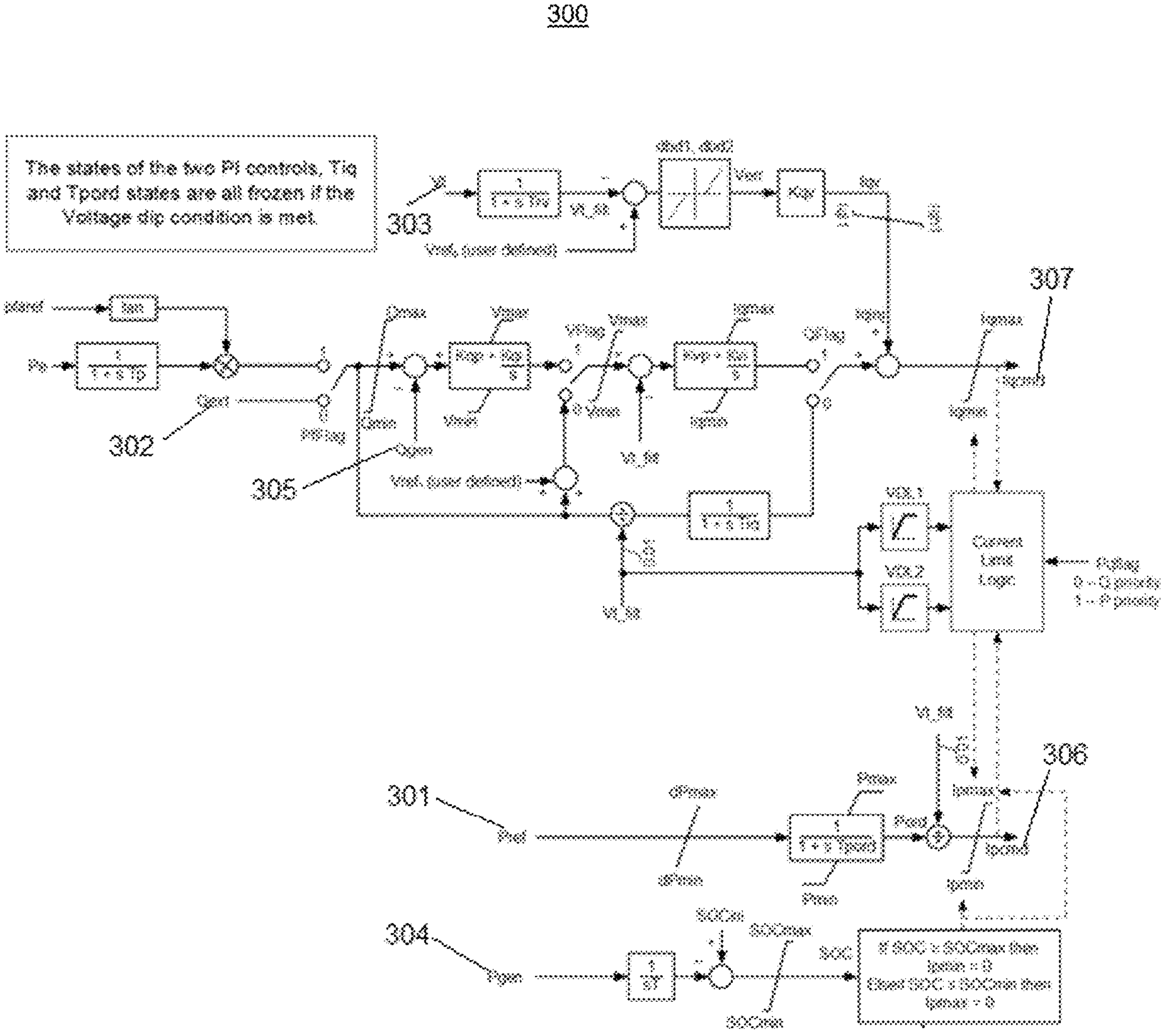
PRIOR ART FIG. 2
FIG. 2 is a block diagram illustrating an inverter battery storage control system in accordance with the prior art.
Figure 3:
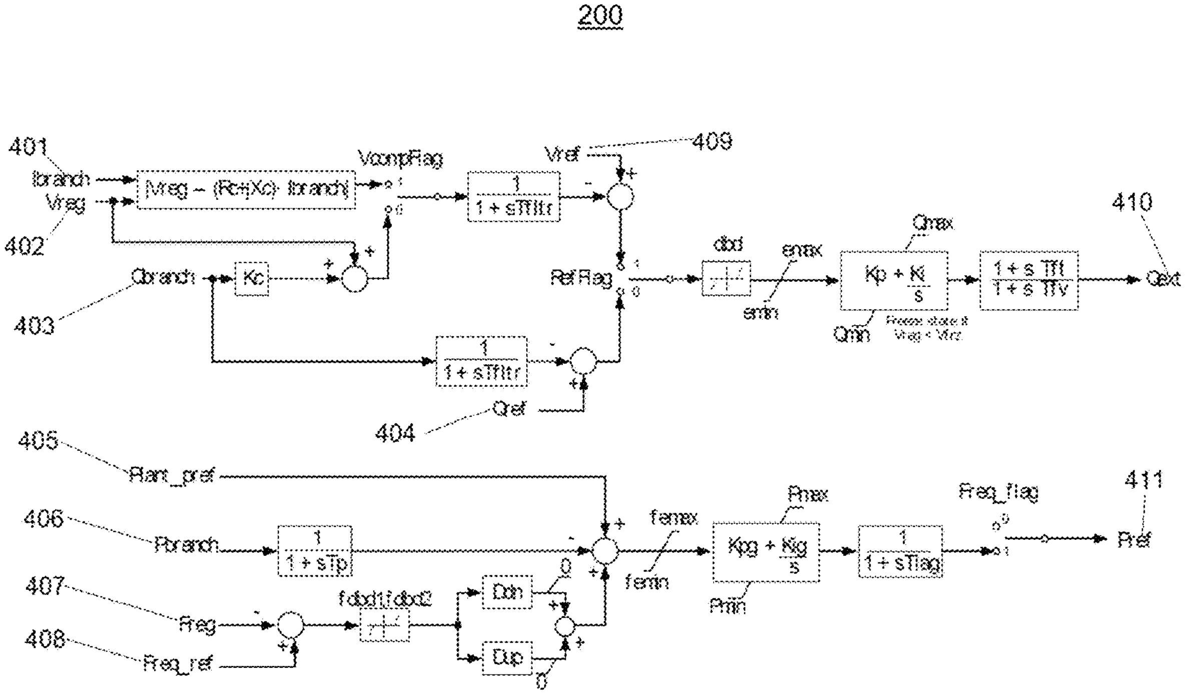
PRIOR ART FIG. 3
FIG. 3 is a block diagram illustrating the PV plant supervisory control system of FIG. 1 in accordance with the prior art.

Setpoints 5007 and measurements 5005 are processed by the IBR controller model 5001 (e.g., 200). The controller model 5001 implements supervisory control functions as illustrated in FIG. 3. The setpoints 5007 may include active power reference Plant_pref 405, frequency reference Freq_ref 408, reactive reference Qref 404, voltage reference Vref 409 and so forth. The measurements 5005 may include current Ibranch 401, voltage Vreg 402, reactive Qbranch 403, active power Pbranch 406, frequency Freq 407 and so forth. The controller model 5001 sends an active power command Pref 411 (or 301) and a reactive power command Qext 410 (or 302) to an inverter control model 5002 (e.g., 300). The inverter control model 5002 which is illustrated in FIG. 2 sends desired active current Ipcmd 306 and desired reactive current Iqcmd 307 to a generator model 5003. The generator model 5003 produces active Ip and reactive Iq currents and sends them to a network solution model 5004. The network solution model 5004 produces a terminal voltage measurement and sends the measurement to the generator model 5003 and to the control model 5002. Also, the network solution model 5004 produces measurements 5005 for the plant controller model 5001.

The completed PSCAD model can be exported from the PSCAD modeling environment 1500 in "pscx" or "psc" file formats. Note that to protect intellectual property, advanced control models, such as for inverter control 300 or plant supervisory control 200, may be supplied by their respective vendors as binary libraries.

Figure 6:
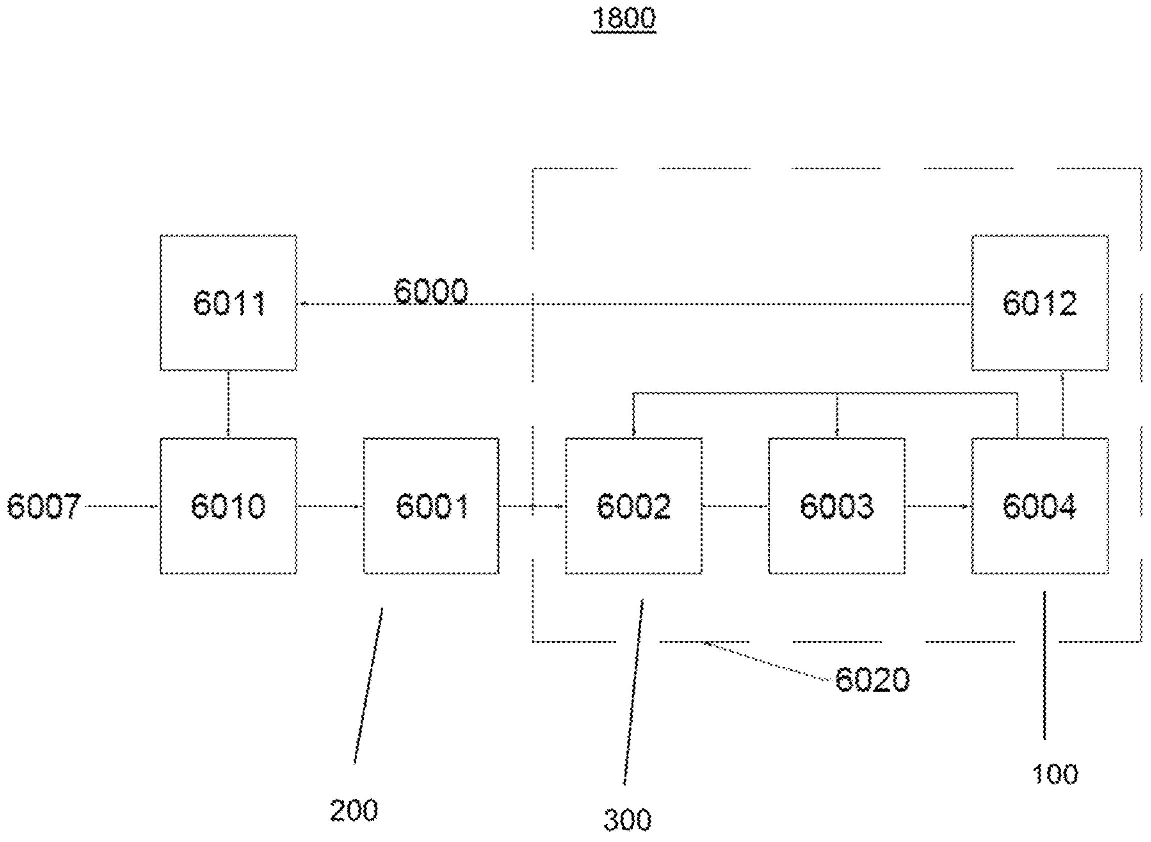
FIG. 6 is a block diagram illustrating hardware-in-the-loop testing in accordance with an embodiment of the application.

FIG. 6 is a block diagram illustrating hardware-in-the-loop ("HIL") testing in accordance with an embodiment of the application. In particular, FIG. 6 illustrates an IBR model 6020 in a hardware-in-the-loop ("HIL") simulation environment 1800.

The HIL simulation environment 1800 can import a PSCAD output file with or without binary libraries. Alternatively, the model can be created originally with a HIL model editor.

Referring to FIG. 6, measurements 6000 are acquired by a phasor data concentrator ("PDC") 6011 and together with setpoints 6007 processed by a test automation server 6010 (e.g., 1000) and sent to a plant controller 6001 (e.g., 200) which is illustrated in more detail in FIG. 3. The setpoints 6007 may include active power reference Plant_pref 405, frequency reference Freq_ref 408, reactive reference Qref 404, voltage reference Vref 409 and so forth.

The plant controller 6001 sends an active power command Pref 411 and a reactive power command Qext 410 to an inverter control model 6002 (e.g., 300). The inverter control model 6002, which is illustrated in more detail in FIG. 2, sends desired active current Ipcmd 306 and desired reactive current Iqcmd 307 to a generator model 6003.

The generator model 6003 produces active Ip and reactive Iq currents and sends them to a network solution model 6004. The network solution model 6004 produces a terminal voltage measurement and sends it to the generator model 6003 and the inverter control model 6002. Also, the network solution model 6004 produces POI measurements and sends them to a model power meter 6012.

The network solution model 6004 represents the PV plant (e.g., 100) including PV arrays 110, inverters 120, inverter transformers 130, medium voltage feeders 140, substation transformers 150, interconnection line 160, POI 170, plant reactive compensation devices 180, and the plant medium voltage bus 190. Note that tests may be executed in manual mode and in this case the automation server 6010 is a non-essential component of the testbed.

The model power meter 6012 acting as a phasor measurement unit ("PMU") communicates electrical properties 6000 (or 201) to the PDC 6011 using a communication protocol such as IEEE C37.118. For reference, synchrophasors are vectors that contain the magnitude and angle for each measurement with a timestamp. The amplitude portion of this measurement is the calculated RMS value. The angle is the instantaneous phase angle with respect to the cosine function at the given system frequency, synchronized in time. The angle (ang) and magnitude (mag) of voltage, current and frequency are periodically sent to the controller every cycle. Voltage and current measurements can be positive sequence voltage V1 and current I1.

Referring again to FIG. 6, the PDC block 6011 processes the synchrophasors to calculate controller inputs 401, 402, 403, 404, 405. All synchrophasor data is verified to be a valid number. Measurements that are not numbers are dropped and after a configurable timeout the plant controller may raise an alarm. Note that the active and reactive power sign Isign is positive if the magnitude of current I1 is positive and is negative otherwise.

The frequency deviation 407 used in the controller 200 is calculated from frequency magnitude FREQ_mag and frequency base Fbase, i.e., nominal system frequency being 60 Hz in the United States, as follows:

$$Freq=(FREQ.mag-Fbase)/Fbase \quad (1)$$

Measured voltage Vreg 402 is calculated as follows:

$$Vreg=\text{V1\_mag}/Vbase \quad (2)$$

Measured current Ibranch 401 is calculated as follows:

$$Ibranch=\text{I1\_mag}/Mbase/Vbase \quad (3)$$

Phase Phi used in the calculation below is computed as a difference between positive sequence voltage angle and positive sequence current angle and converted degrees to radians as follows:

$$Phi=\text{DEG\_TO\_RAD}(\text{V1\_ang}-\text{I1\_ang}) \quad (4)$$

Measured active power Pbranch 406 is calculated as follows, where Mbase is the Generator Machine Base (VA):

$$Pbranch=(3*\text{V1\_mag}*\text{I1\_mag}*\text{COS}(Phi))*I\text{sign}/Mbase \quad (5)$$

Measured reactive power Qbranch 403 is calculated as follows:

$$Qbranch=(3*\text{V1\_mag}*\text{I1\_mag}*\text{SIN}(Phi))*I\text{sign}*\text{VARsign}/Mbase \quad (6)$$

Functional blocks 6002, 6003, 6004, and 6012 of the IBR model 6020 are executed in the HIL modeling environment 1800. Note that in some embodiments of this application, equipment such as inverter control 6002 or any other piece of equipment can be represented as a physical device but not their models.

In the following, factory acceptance testing ("FAT") in the HIL modeling environment 1800 is described.

Figure 8:
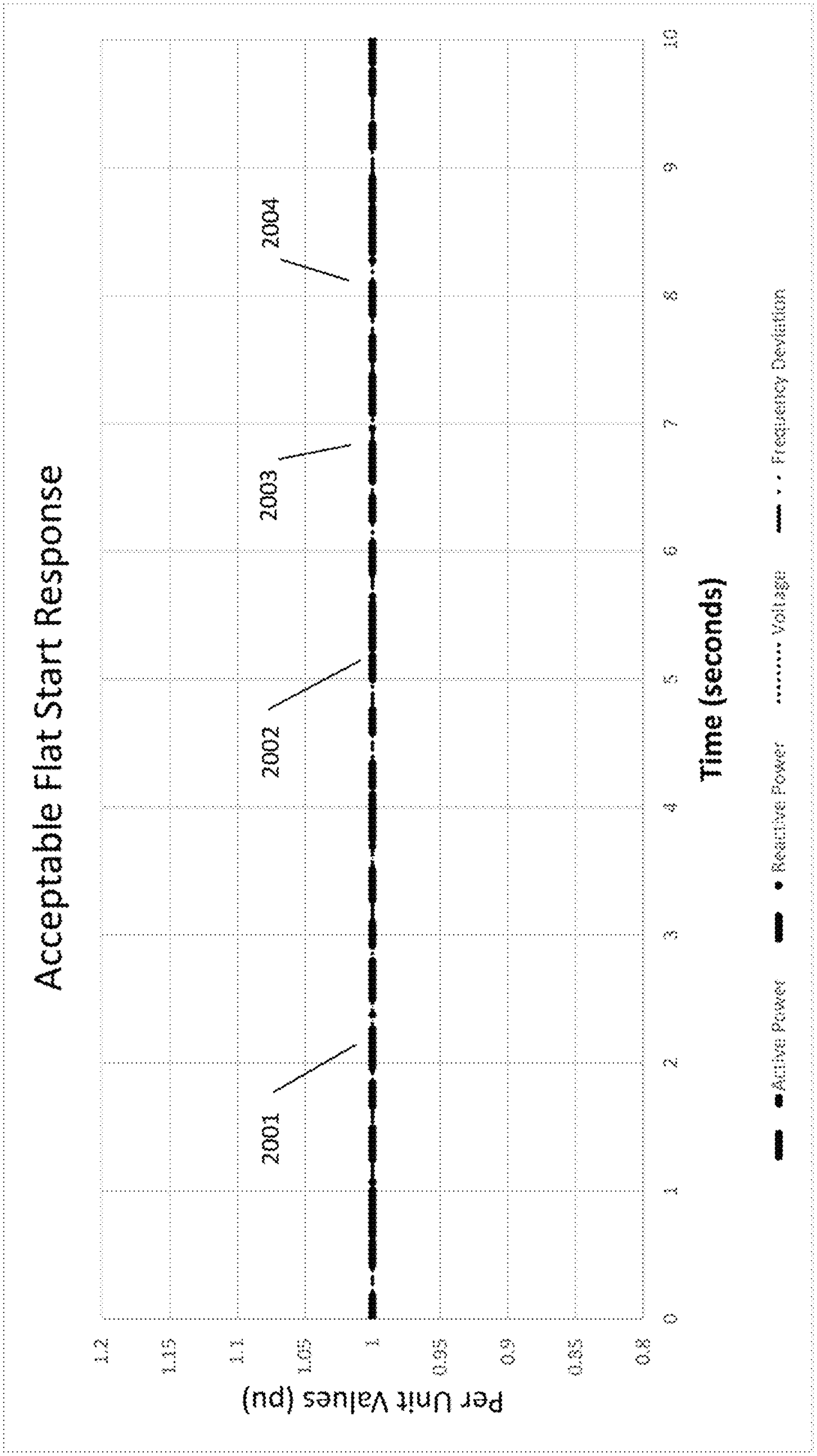
FIG. 8 is a graph illustrating a flat start test in accordance with an embodiment of the application.

FIG. 8 is a graph illustrating a flat start test in accordance with an embodiment of the application. In particular, FIG. 8 illustrates initial test conditions. A no-disturbance 10 second test demonstrates flat responses of voltage 2001, active power 2002, reactive power 2003, and frequency 2004.

Figure 9:
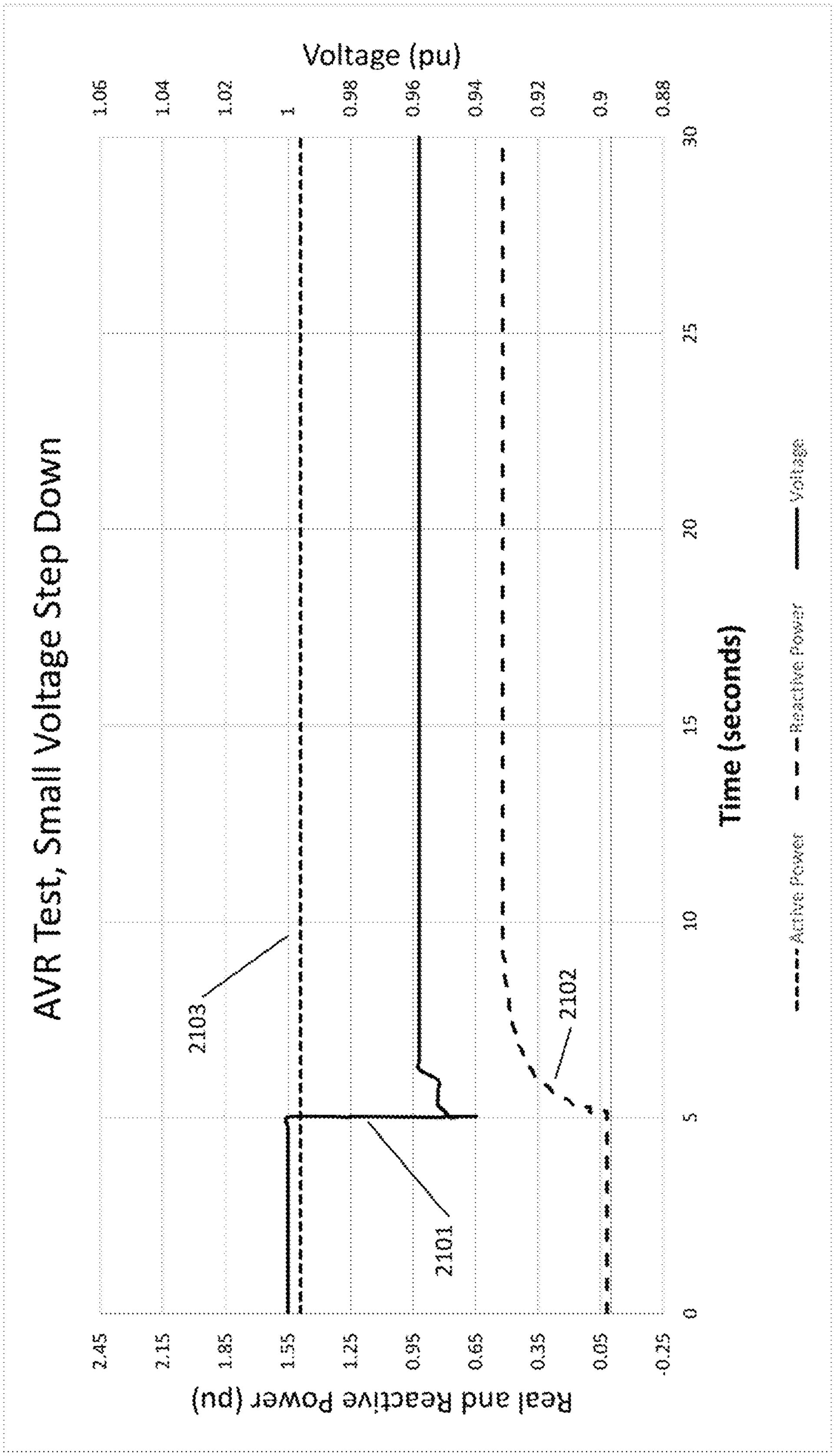
FIG. 9 is a graph illustrating a small voltage step down test in accordance with an embodiment of the application.

FIG. 9 is a graph illustrating a small voltage step down test in accordance with an embodiment of the application. In particular, FIG. 9 illustrates an automatic voltage regulator ("AVR") voltage small step-down test. A step decrease of voltage at the POI 2101 is applied. The voltage step may be 3% of nominal voltage. In response, the AVR should transition the plant operating point to maximum or near maximum lagging power factor increasing injection of reactive power 2102. Any oscillations should be well damped. The operating point should reflect AVR reactive droop and deadband settings. Power control should keep sustained POI active power 2103.

Figure 10:
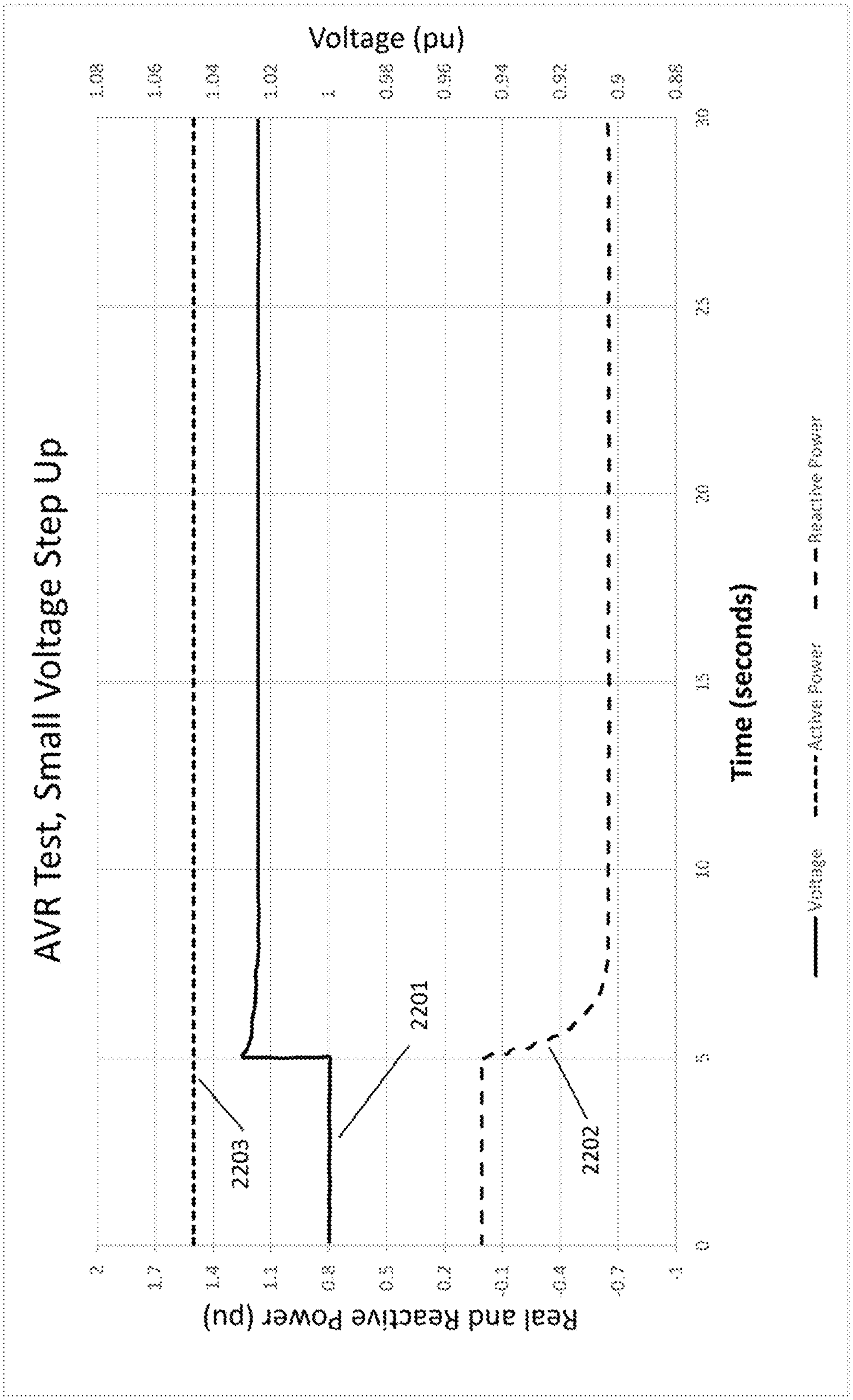
FIG. 10 is a graph illustrating a small voltage step up test in accordance with an embodiment of the application.

FIG. 10 is a graph illustrating a small voltage step up test in accordance with an embodiment of the application. In particular, FIG. 10 illustrates an AVR voltage small step up test. A step increase of voltage at the POI 2201 is applied. The voltage step up may be, for example, 3% of nominal voltage. The AVR should transition the plant operating point to maximum or near maximum leading power factor increasing reactive power absorption 2202. Any oscillations should be well damped. The operating point should reflect AVR reactive droop and deadband settings.

Figure 11:
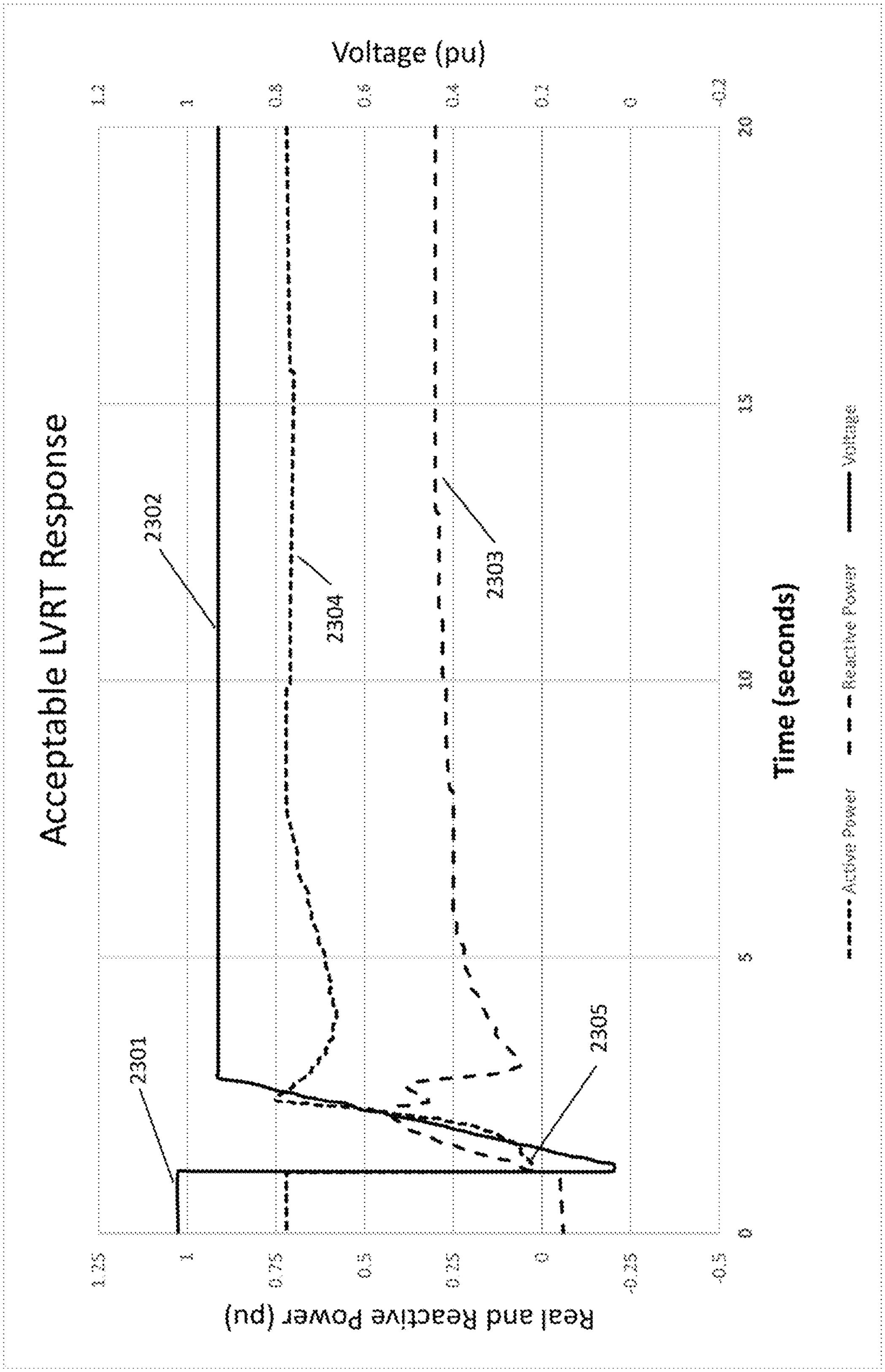
FIG. 11 is a graph illustrating a low voltage ride-through ("LVRT") test in accordance with an embodiment of the application.

FIG. 11 is a graph illustrating a low voltage ride-through ("LVRT") test in accordance with an embodiment of the application. The required low voltage profile boundary is applied to the POI 2301. The profile starts at 2301, e.g., at 1.0, and ends at 2303, e.g., at 0.9 per-unit. This test is performed with an initial condition of the IBR operating at a 0.95 lagging power factor at the POI and with the plant 100 operating at leading power factor at the POI, e.g. 0.95. The IBR model 6020 validates dynamic reactive response 2303, active power response 2304, and the absence of momentary cessation. For the low voltage transient, the IBR model 6020 injects reactive current throughout the voltage recovery period. In a LVRT event at POI, both active and reactive power are necessarily zero at zero voltage 2305. Reactive injection at the POI should be observed immediately or shortly after the voltage begins to increase from zero. For a stable voltage POI, e.g., 0.9 p.u., the AVR provides a voltage support moving the operating point towards almost full reactive production power factor lagging. The real power recovery begins before the POI voltage returns to, e.g., 0.9 p.u. Real power should be restored to full power within a certain time, e.g., 1.0 second, after the POI voltage is restored to e.g., 0.9 p.u. A small reduction in active power may be acceptable to provide more reactive power.

Figure 12:
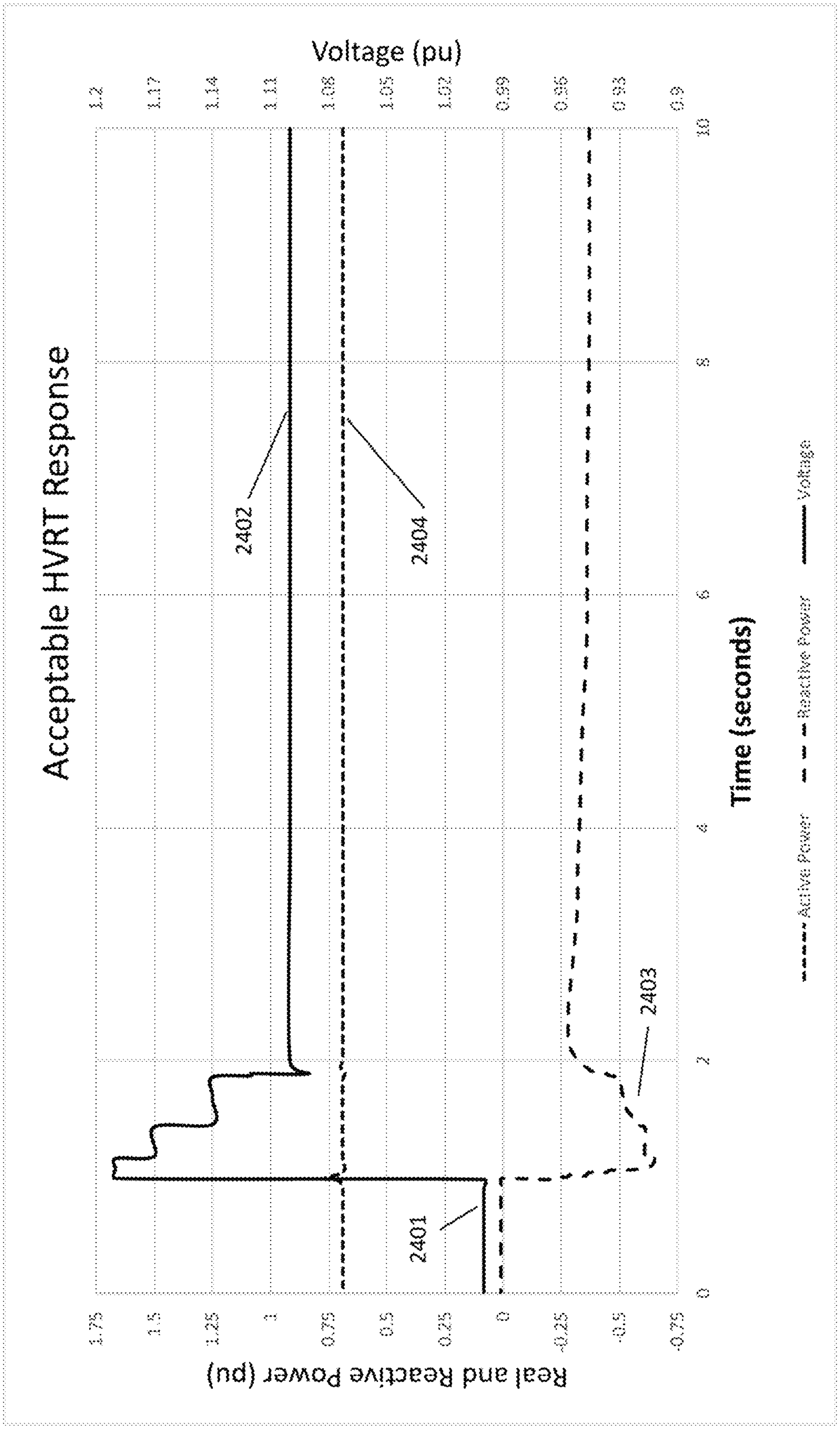
FIG. 12 is a graph illustrating a high voltage ride-through ("HVRT") test in accordance with an embodiment of the application.

FIG. 12 is a graph illustrating a high voltage ride-through ("HVRT") test in accordance with an embodiment of the application. The high voltage profile boundary is applied at the POI. The voltage profile starts at 1.0 p.u. 2401 and ends at 1.1 p.u. 2402. This test is performed with the plant 100 operating at a lagging power factor 0.95 at the POI and with the plant 100 operating at leading power factor 0.95 at the POI. The IBR model 6020 confirms the dynamic reactive response 2403 and the absence of momentary cessation. During the high voltage transient, the IBR model 6020 provides a fast dynamic response to absorb reactive power. The plant 100 must absorb a significant amount of reactive power at the POI during the high voltage transient, and ideally within 0.5 seconds of the transient inception. For a 1.1 pu sustained POI voltage, the AVR should move the operating point towards nearly full leading reactive absorption. Real power 2404 should be sustained under high voltage conditions. A small reduction of power reduction may be acceptable to provide more reactive power absorption.

Figure 13:
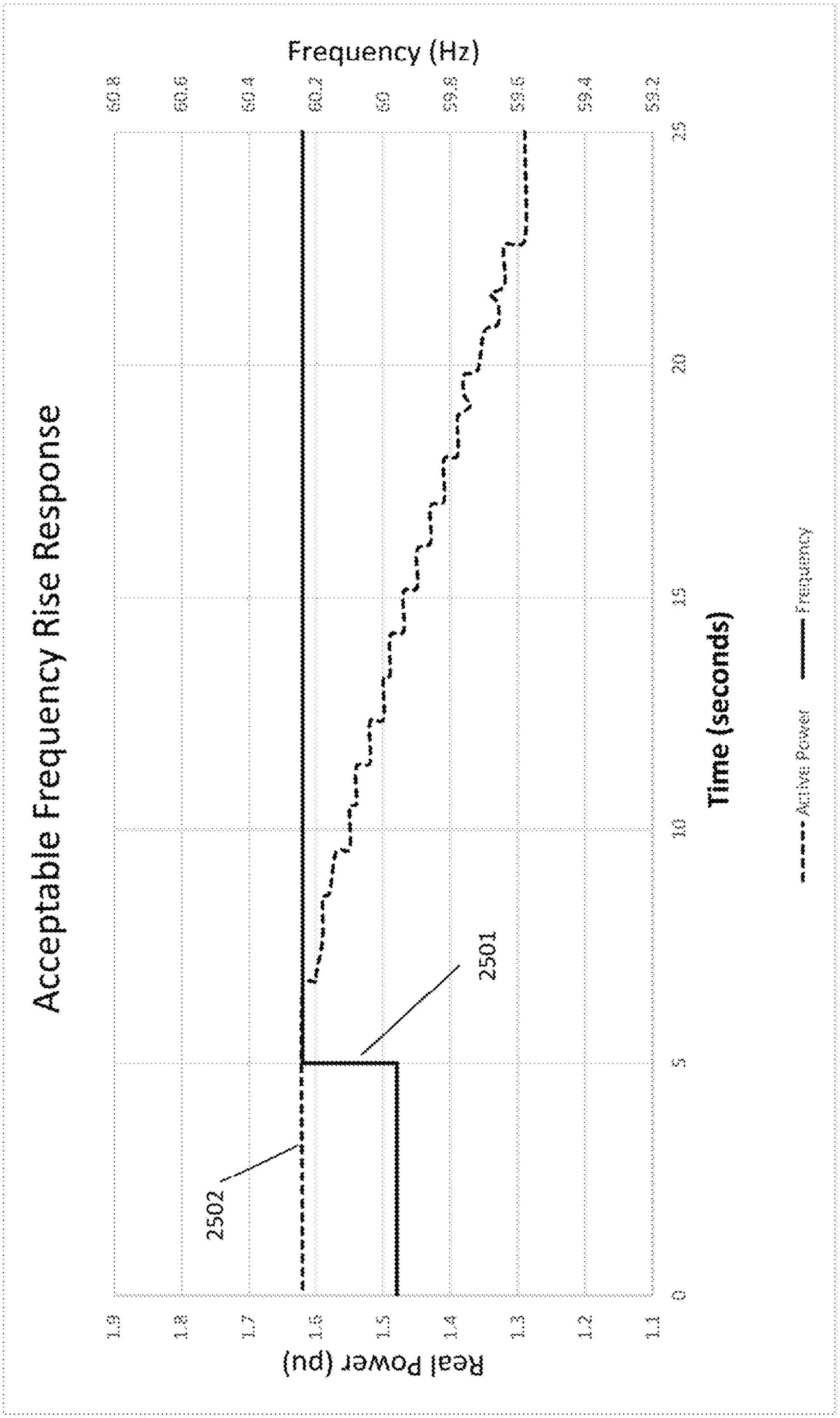
FIG. 13 is a graph illustrating a frequency droop test in accordance with an embodiment of the application.

FIG. 13 is a graph illustrating a frequency droop test in accordance with an embodiment of the application. In particular, FIG. 13 illustrates a small over-frequency disturbance test. In the test, a step increase 2501 of 0.3 Hz from the nominal frequency 60 Hz is applied. The controller 200 should reduce the real power 2502 according to the frequency droop and deadband characteristics. A frequency response is required assuming there is sufficient headroom to respond to frequency changes. Initially, the real power 2502 should be set at 80% of maximum. Two frequency simulations may be performed, one when the plant 100 is curtailed with available headroom (i.e., power reserve), and another when the plant 100 has no power headroom.

Figure 14:
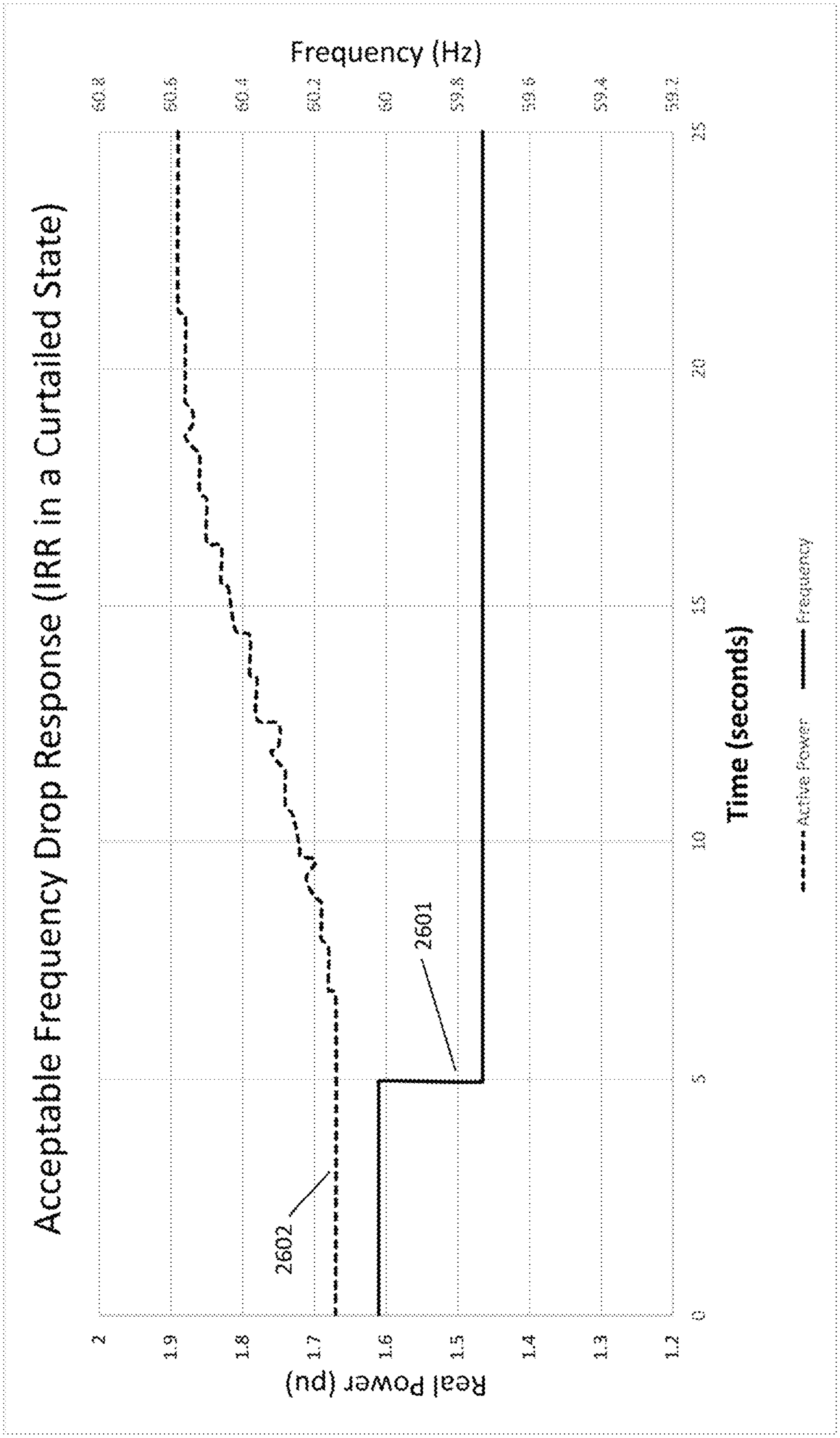
FIG. 14 is a graph illustrating a frequency rise test in accordance with an embodiment of the application.

FIG. 14 is a graph illustrating a frequency rise test in accordance with an embodiment of the application. In particular, FIG. 14 illustrates a small under-frequency disturbance test. In the test, a 0.3 Hz step decrease 2601 from nominal frequency 60 Hz is applied. The controller 200 should increase the real power dispatch according to the frequency droop and deadband characteristic. A frequency response is required assuming there is sufficient headroom (i.e., power reserve) to respond to frequency changes. The real power 2602 should initially be set at 80% of maximum. Two frequency drop simulations may be performed, one when the plant 100 is curtailed with headroom, and another when the plant 100 has no power headroom.

Figure 15:
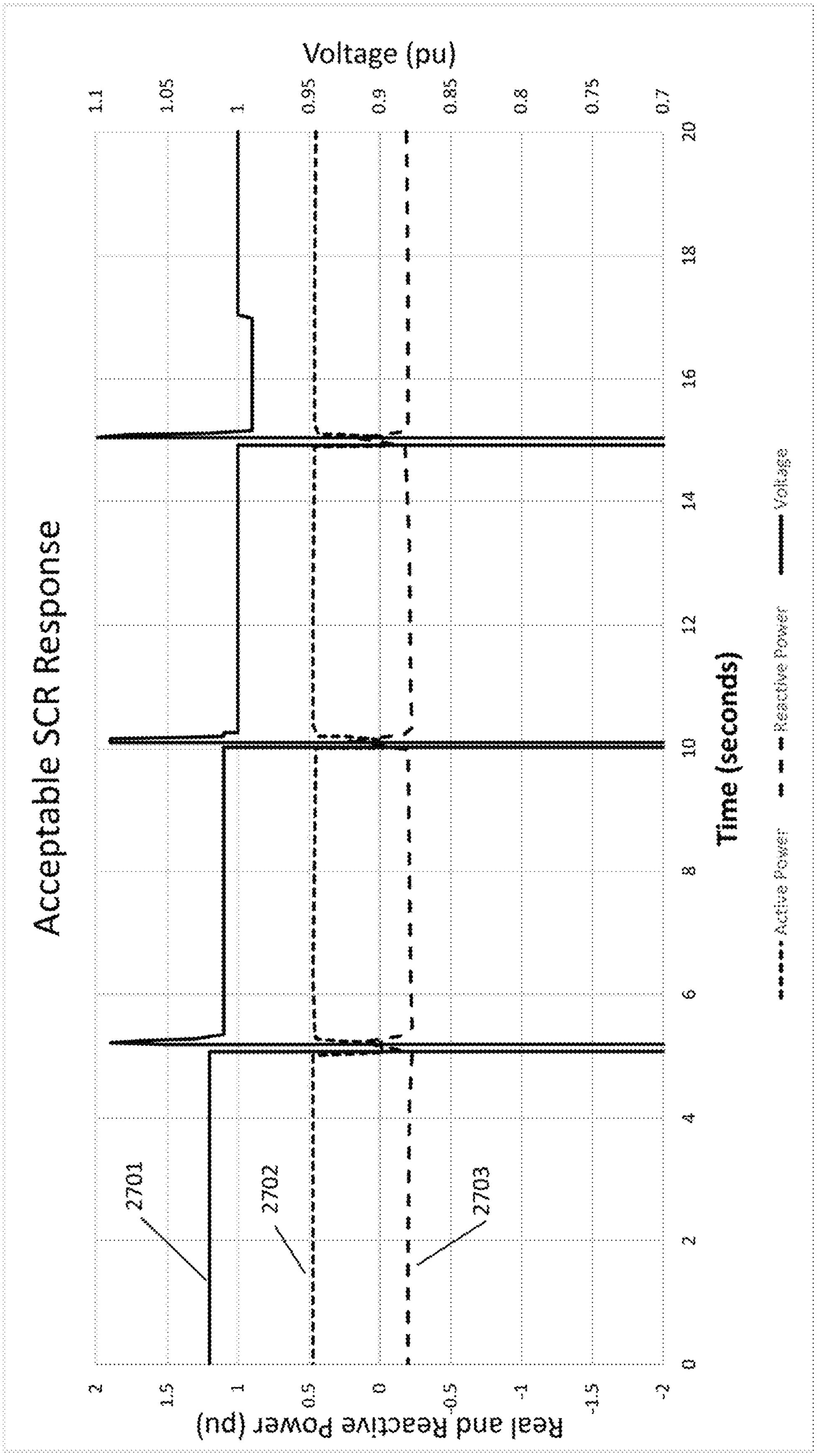
FIG. 15 is a graph illustrating a test with varying short circuit ratios ("SCR") in accordance with an embodiment of the application.

FIG. 15 is a graph illustrating a test with varying short circuit ratios ("SCR") in accordance with an embodiment of the application. In particular, FIG. 15 illustrates a system strength test. Voltage 2701, active power 2702, and reactive power 2703 are shown in the graph. This test examines the plant's performance at varying short circuit ratios ("SCR"). The SCR of the electric grid may vary over time due to its operating conditions such as contingencies, generation status, etc. It is important that the model's performance is satisfactory under a range of SCR conditions. The IBR model 6020 should be tested under at least short circuit ratios of 5, 3, 1.5, and 1.2. A test case may be established in which the POI of the plant 100 is connected to an infinite bus by a branch with controlled impedance. Initially, the branch impedance may be set to a reactance needed to achieve the desired short circuit ratio. After applying a 4-cycle bolted three-phase fault to the POI, the branch impedance changes to reflect a post-disturbance system with higher impedance. A few short circuit ratios may be tested in the same simulation by incrementally increasing the reactance value, provided there is enough run time between changes for the model to reach a steady state.

The phase angle jump test confirms the plant model's performance with a sudden increase or decrease in voltage phase angle. The test consists of exposing the IBR model 6020 to an instantaneous increase in the voltage phase, and an instantaneous decrease in the voltage phase. The test may characterize the maximum phase angle jump that the plant model can withstand, stay online, and return to normal operation. The test may start with a +/−180 degree jump, and if the model 6020 fails, decrease, or increase the phase angle change by 30 degrees each time until the model passes the test.

Figure 16:
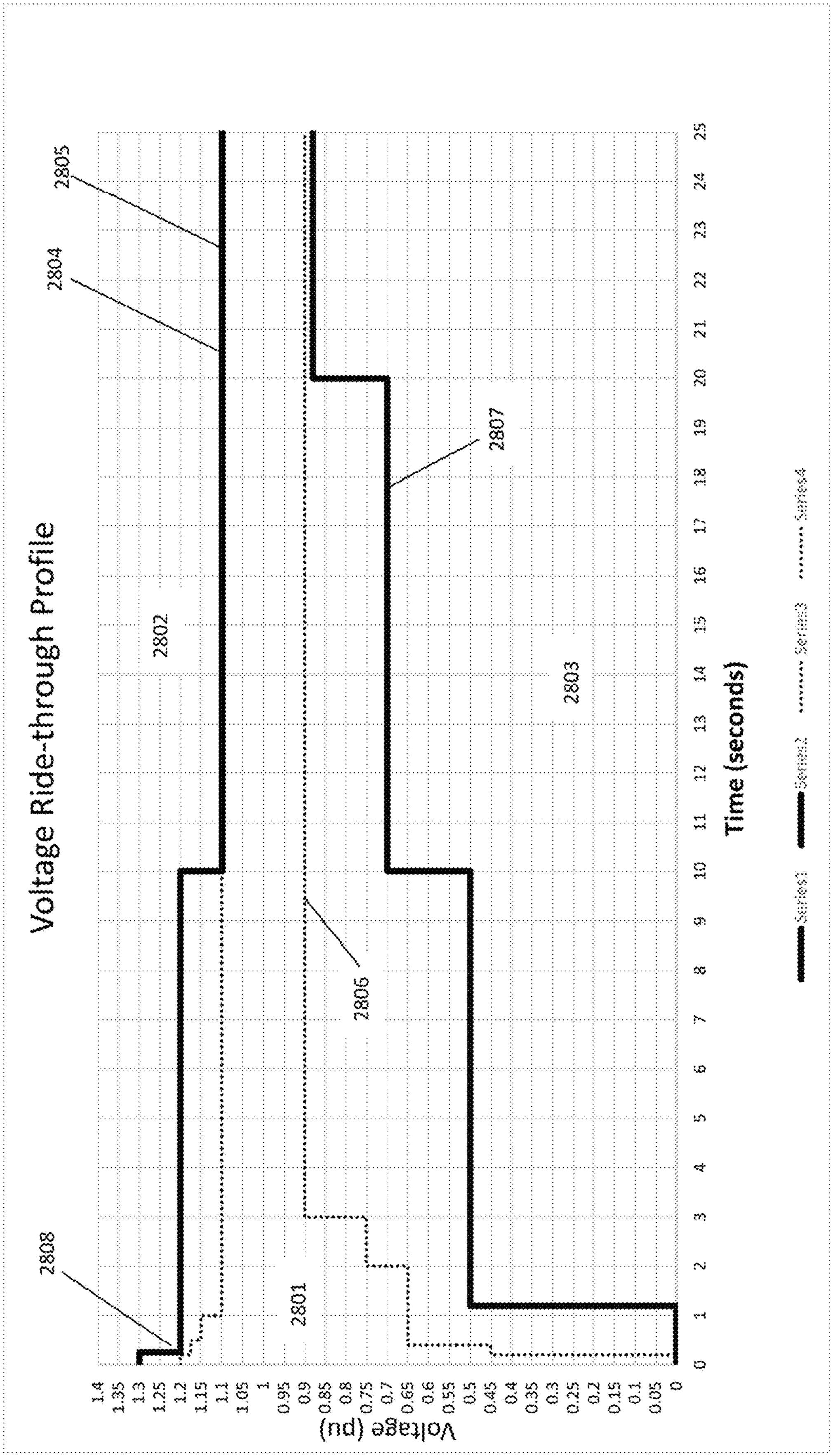
FIG. 16 is a graph illustrating a plant "no trip zone" during a voltage excursion in accordance with an embodiment of the application; and, FIG. 17 is a flow chart illustrating operations of modules within an information system for configuring and testing voltage and power controls in a plant, in accordance with an embodiment of the application.

FIG. 16 is a graph illustrating a plant "no trip zone" 2801 during a voltage excursion in accordance with an embodiment of the application. The "no trip zone" 2801 is typically defined at the high side of the substation transformer 150 with voltage (pu) and minimum time pairs for the high voltage boundary 2804 and the low voltage boundary 2807. Note that voltage differences between the point of voltage measurement and the high side of the substation transformer 150 must be considered. Inverter low and high voltage protection "must trip" zones are 2802, 2803. The zones' boundaries 2805 and 2806 are typically defined with inverter terminal voltage and maximum time pairs for high and low voltages, respectively.

The FAT tests may also include inverter control, active power ramp up and down, AVR ramp up and down, BESS state-of-charge ("SOC") limits, BESS round trip efficiency, power factor control, reactive power control, controller redundancy and power cycle, ancillary services such as frequency reg-up, reg-down, responsive reserve, fast frequency response, reactive power control or voltage control among other tests. Plant dynamic response in the above-mentioned tests may be characterized by reaction time, rise time, settling time, step response time, overshoot, or other parameters.

Referring again to FIG. 6, manual execution of the above described tests may result in testing inconsistencies for these complex tests which involve multiple configuration parameters. To avoid inconsistencies, simplify testing, and increase testing quality, FAT may be automated. An automation server 6010 schedules and executes specified tests, automatically validates test results, automatically tunes the plant control system 200, and reports test results. Note that the automation server 6010 may be implemented as a standalone device, or an integral part of the control system 200, and/or HIL server (e.g., 1000).

Figure 1:
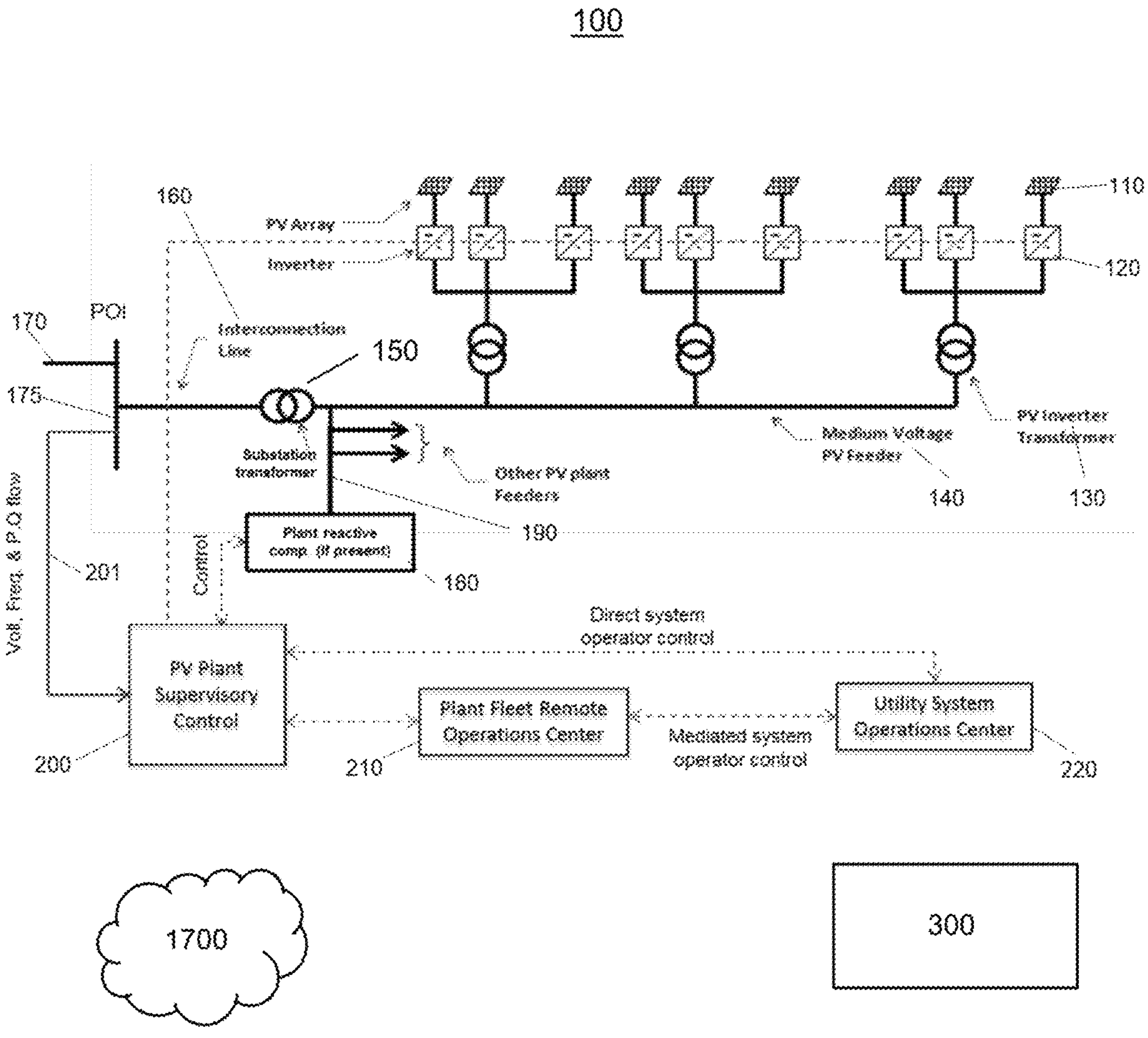
PRIOR ART FIG. 1
FIG. 1 is a block diagram illustrating an example PV power plant in accordance with the prior art.
Figure 7:
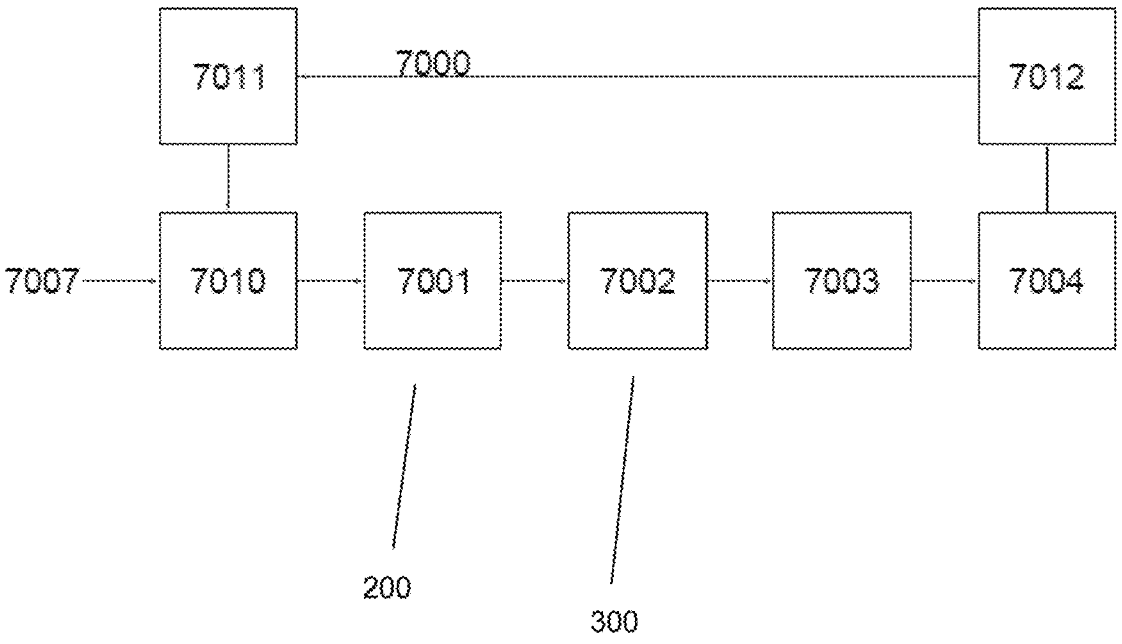
FIG. 7 is a block diagram illustrating site acceptance testing in accordance with an embodiment of the application.

FIG. 7 is a block diagram illustrating site acceptance testing in accordance with an embodiment of the application. In particular, FIG. 7 is a functional diagram illustrating site acceptance testing ("SAT") and its automation in accordance with an embodiment of the application. The plant automation equipment is represented in FIG. 7 by a plant controller 7001 (e.g., 200) which manages an inverter control 7002 (e.g., 300). Plant equipment is represented by inverters 7003 (e.g., 130) and the rest of the equipment 7004 shown in FIG. 1 (e.g., 110, 120, 140, etc.). Power meters 7017 acting as PMUs communicate current and voltage synchrophasors 7000 to a PDC 7011. The PDC 7011 acquires the synchrophasors 7000 and processes them as described above with reference to FIG. 6. The automation server 7010 then schedules and executes the tests described above with reference to FIGS. 8 through 16.

According to one embodiment, there is provided a method for testing a plant control system 200 of an inverter-based resource ("IBR") 100 coupled to an electric power grid 170, the method comprising: using a power systems modeling environment 1500 implemented in an information system 1000, generating an IBR model 6020 (i.e., of the IBR 100), the IBR model 6020 including an inverter control model 6002, a generator model 6003, a network solution model 6004, and a model power meter 6012; using a hardware-in-the-loop ("HIL") simulation environment 1800 including the IBR model 6020, a phasor data concentrator ("PDC") 6011, a test automation server 6010, and the plant control system 200 (or 6001), performing a test of the plant control system 200 by iteratively: receiving measurements from the PDC 6011 and setpoints from the test automation server 6010 and sending the measurements and the setpoints to the plant control system 200; generating and sending an active power command and a reactive power command from the plant control system 200 to the inverter control model 6002; generating and sending desired active current and desired reactive current from the inverter control model 6002 to the generator model 6003; generating and sending active and reactive currents from the generator model 6003 to the network solution model 6004, the network solution model 6004 generating and sending a terminal voltage measurement to the generator model 6003 and the inverter control model 6002, the network solution model 6004 generating and sending POI measurements to the model power meter 6012; generating synchrophasors including electrical property information and sending the synchrophasors from the model power meter 6012 to the PDC 6011; generating the measurements from the synchrophasors at the PDC 6011; and, storing the synchrophasors as results of the test in the test automation server 6010.

In the above method, the setpoints may include an active power reference, a frequency reference, a reactive reference, and a voltage reference. The measurements may include current, voltage, reactive power, and active power. The network solution model 6004 represents the IBR 100 including PV arrays, inverters, inverter transformers, medium voltage feeders, substation transformers, interconnection lines, POI, plant reactive compensation devices, and plant medium voltage buses. The testing may be factory acceptance testing ("FAT"). The testing may be site acceptance testing ("SAT"). The IBR 100 may be a battery energy storage system ("BESS"). The IBR 100 may be a renewable energy plant such as a photovoltaic ("PV") or a wind plant. The test automation server 6010 may include the information system 1000 and the IBR model 6020. The test automation server 6010 may be communicatively coupled to the plant control system 200 over a network 1700. The test may be one or more of a low voltage protection test, a high voltage protection test, a plant reactive limit test, a voltage control accuracy test, an AVR dynamic characteristics test, a substation transformer OLTC control test, a plant reactive compensation test, and an active power and primary frequency control test (see FIG. 17 as further described below). The steps (e.g., 900) of the test may be performed automatically under control of the test automation server 6010. The test may be a quality assurance test. And, the IBR model 6020 may be predetermined.

The embodiments described herein may contribute to an improved method and system for quality assurance testing of control systems 200 for inverter-based resources 100 and may provide one or more advantages. First, automation of FAT and SAT reduces testing inconsistencies. Second, automation of FAT and SAT simplifies the testing process.

Aspects of the methods and systems described herein may be illustrated with the aid of a flowchart.

Figure 17:
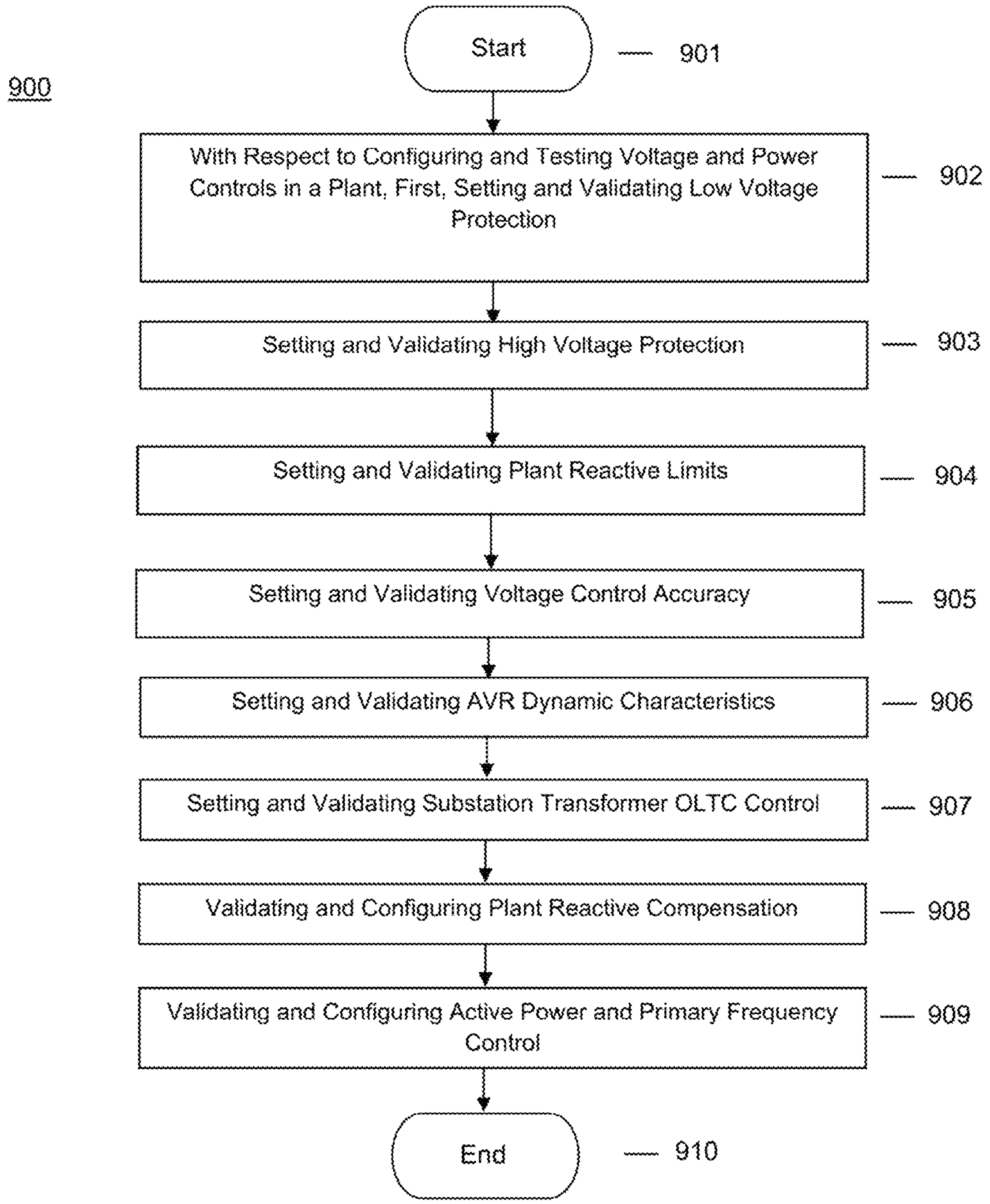

FIG. 17 is a flow chart illustrating operations 900 of modules (e.g., 1420, 1500) within an information system (e.g., 200, 210, 220, 1000) for configuring and testing voltage and power controls in a plant 100, in accordance with an embodiment of the application.

At step 901, the operations 900 start.

At step 902, low voltage protection is set and validated such that the plant 100 remains connected during defined under-voltage excursions to support electric system. Initial inverter under-voltage protection settings are configured to be wider than the "no trip zone" as described above with reference to FIG. 16. The LVRT test as described above with reference to FIG. 11 is executed. Referring to FIG. 16, starting with the inverter's shortest time setting, if the low voltage protection defined by the time setting in question trips, then decrease the low voltage setting and increase the low voltage duration. The inverter's protection settings should be defined with a margin of sensitivity to assure "no trip zone" operation. If low voltage protection defined by the time setting in question doesn't trip the inverter 120, then continue executing the LVRT test with the next inverter time setting until the inverter protection voltage and time pairs are exhausted.

At step 903, high voltage protection is set and validated such that the plant 100 remains connected during defined over-voltage excursions to support electric grid. Initial inverter over-voltage protection settings are configured to be wider than the "no trip zone". The HVRT test as described above with reference to FIG. 12 is executed. Starting with the inverter's shortest time setting, if the high voltage protection defined by the time setting in question trips, then increase the high voltage setting and increase the high voltage duration. The inverter's protection settings should be defined with a margin of sensitivity to assure "no trip zone" operation. Referring to FIG. 16, the 2808 high voltage protection point on "must trip" boundary 2802 may be too close to the "no trip zone" boundary 2804. Therefore, the point should have increased high voltage duration. If the high voltage protection defined by the time setting in question doesn't trip, then continue executing the next HVRT test with the next inverter time setting until the inverter protection voltage and time pairs are exhausted.

At step 904, plant reactive limits are set and validated. Characterize plant reactive capability at various power generation levels such as for example 0, 0.2, 0.5 and 0.8 p.u. by increasing the voltage reference 409 until the measured reactive power reaches the capacitive capability requirements. Repeat the test by decreasing the voltage reference 409 for inductive reactive capability. Validate cone-shaped and/or rectangular-shaped reactive limits.

At step 905, voltage control accuracy is set and validated. Characterize voltage control accuracy when reactive power reaches reactive capability limits. If voltage control accuracy doesn't meet (e.g., 2%) the accuracy requirement, then decrease the AVR reactive droop until the desired accuracy is reached.

At step 906, AVR dynamic characteristics are set and validated. Execute AVR step-down and step-up tests as described above with reference to FIGS. 9 and 10, respectively. Characterize plant AVR dynamic response and validate response characteristics complying with the plant requirements. If response time is longer than the required time, decrease inverter reactive power ramp-up and ramp-down rates and tune AVR control loop more aggressively.

At step 907, the substation transformer's OLTC control (e.g., 150) is set and validated and coordinated with inverter protection and AVR. The substation transformer's OLTC controller is used to maintain a voltage level at the medium voltage feeders 140. The controller transmits commands to increase and decrease the transformer OLTC. Typically, the controller provides for adjustable bandcenter, bandwidth, line drop compensation, time delay, and inter-tap time delay. The controller's time delay and inter-tap delay should allow for the prevention of inverter terminal under-voltage and over-voltage protection trips while recovering from low and high voltage events. The AVR and OLTC controls are typically decoupled with the AVR having a short control time and the OLTC having a comparatively long control time. Verification should be made that the AVR and OLTC don't interact with each other.

At step 908, plant reactive compensation 180, such as shunt capacitors and reactors, are validated and configured.

At step 909, active power and primary frequency control are validated and configured.

At step 910, the operations 900 end.

According to one embodiment, each of the above steps 901-910 may be implemented by a respective software module 1420. According to another embodiment, each of the above steps 901-910 may be implemented by a respective hardware module 1500 (e.g., application-specific hardware 1500). According to another embodiment, each of the above steps 901-910 may be implemented by a combination of software 1420 and hardware modules 1500. For example, FIG. 17 may represent a block diagram illustrating the interconnection of specific hardware modules 901-910 (collectively 1500) within the information system or systems 1000, each hardware module 901-910 adapted or configured to implement a respective step of the method of the application.

According to one embodiment, one or more of the software 1420 and hardware modules 1500 (or to components referred to as a "module" herein) may be implemented by one or more information systems 1000 or components thereof.

According to one embodiment, certain implementations of the functionality of the present application are sufficiently mathematically, computationally, or technically complex that application-specific hardware (e.g., 1500) or one or more physical computing devices (e.g., 1000, 2030, 2050) (using appropriate executable instructions (e.g., 1420)) may be necessary or essential to perform that functionality, for example, due to the volume or complexity of the calculations involved and/or to provide results substantially in real-time.

While this application is primarily discussed as a method, a person of ordinary skill in the art will understand that the apparatus discussed above with reference to an information system 1000 may be programmed to enable the practice of the method of the application. Moreover, an article of manufacture for use with an information system 1000, such as a pre-recorded storage device or other similar computer readable medium or computer program product including program instructions recorded thereon, may direct the information system 1000 to facilitate the practice of the method of the application. It is understood that such apparatus, products, and articles of manufacture also come within the scope of the application.

In particular, the sequences of instructions which when executed cause the method described herein to be performed by the information system 1000 may be contained in a data carrier product according to one embodiment of the application. This data carrier product may be loaded into and run by the information system 1000. In addition, the sequences of instructions which when executed cause the method described herein to be performed by the information system 1000 may be contained in a computer software product or computer program product (e.g., comprising a non-transitory medium) according to one embodiment of the application. This computer software product or computer program product may be loaded into and run by the information system 1000. Moreover, the sequences of instructions which when executed cause the method described herein to be performed by the information system 1000 may be contained in an integrated circuit product (e.g., a hardware module or modules 1420, 1500) which may include a coprocessor or memory according to one embodiment of the application. This integrated circuit product may be installed in the information system 1000.

The embodiments of the application described above are intended to be examples only. Those skilled in the art will understand that various modifications of detail may be made to these embodiments, all of which come within the scope of the application.

What is claimed is:

1. A method for testing a plant control system of an inverter-based resource ("IBR") coupled to an electric power grid, the method comprising:

using a power systems modeling environment implemented in an information system, generating an IBR model, the IBR model including an inverter control model, a generator model, a network solution model, and a model power meter;

using a hardware-in-the-loop ("HIL") simulation environment including the IBR model, a phasor data concentrator ("PDC"), a test automation server, and the plant control system, performing a test of the plant control system by iteratively:

receiving measurements from the PDC and setpoints from the test automation server and sending the measurements and the setpoints to the plant control system;

generating and sending an active power command and a reactive power command from the plant control system to the inverter control model;

generating and sending desired active current and desired reactive current from the inverter control model to the generator model;

generating and sending active and reactive currents from the generator model to the network solution model, the network solution model generating and sending a terminal voltage measurement to the generator model and the inverter control model, the network solution model generating and sending POI measurements to the model power meter;

generating synchrophasors including electrical property information and sending the synchrophasors from the model power meter to the PDC;

generating the measurements from the synchrophasors at the PDC; and, storing the synchrophasors as results of the test in the test automation server.

2. The method of claim 1, wherein the setpoints include an active power reference, a frequency reference, a reactive reference, and a voltage reference.

3. The method of claim 1, wherein the measurements include current, voltage, reactive power, and active power.

4. The method of claim 1, wherein the network solution model represents the IBR including PV arrays, inverters, inverter transformers, medium voltage feeders, substation transformers, interconnection lines, POI, plant reactive compensation devices, and plant medium voltage buses.

5. The method of claim 1, wherein the testing is factory acceptance testing ("FAT").

6. The method of claim 1, wherein the testing is site acceptance testing ("SAT").

7. The method of claim 1, wherein the IBR is a battery energy storage system ("BESS").

8. The method of claim 1, wherein the IBR is a renewable energy plant such as a photovoltaic ("PV") or a wind plant.

9. The method of claim 1, wherein the test automation server includes the information system and the IBR model.

10. The method of claim 1, wherein the teat automation server is communicatively coupled to the plant control system over a network.

11. The method of claim 1, wherein the test is one or more of a low voltage protection test, a high voltage protection test, a plant reactive limit test, a voltage control accuracy test, an AVR dynamic characteristics test, a substation transformer OLTC control test, a plant reactive compensation test, and an active power and primary frequency control test.

12. The method of claim 11, wherein steps of the test are performed automatically under control of the test automation server.

13. The method of claim 1, wherein the test is a quality assurance test.

14. The method of claim 1, wherein the IBR model is predetermined.

15. A test automation server system for testing a plant control system of an inverter-based resource ("IBR") coupled to an electric power grid, the test automation server system comprising:

a processor coupled to memory and an interface to a network; and, at least one of hardware and software modules within the memory and controlled or executed by the processor, the modules including computer readable instructions executable by the processor for causing the test automation server system to implement the method of claim 1.

* * * * *